United States Patent
Wu

(10) Patent No.: US 9,785,252 B2
(45) Date of Patent: Oct. 10, 2017

(54) METHOD FOR INPUTTING MULTI-LANGUAGE TEXTS

(71) Applicant: FITNII INC., Taipei (TW)

(72) Inventor: Ming-Ying Wu, Taipei (TW)

(73) Assignee: FITNII INC., Taipei (TW)

( * ) Notice: Subject to any disclaimer, the term of this patent is extended or adjusted under 35 U.S.C. 154(b) by 134 days.

(21) Appl. No.: 14/811,769

(22) Filed: Jul. 28, 2015

(65) Prior Publication Data

US 2017/0031457 A1    Feb. 2, 2017

(51) Int. Cl.
| | | |
|---|---|---|
| *G06F 17/20* | (2006.01) | |
| *G06F 3/023* | (2006.01) | |
| *G06F 3/01* | (2006.01) | |
| *G06F 17/22* | (2006.01) | |
| *G06F 17/27* | (2006.01) | |
| *G06F 3/0488* | (2013.01) | |
| *G06F 17/28* | (2006.01) | |

(52) U.S. Cl.
CPC ............ *G06F 3/0233* (2013.01); *G06F 3/018* (2013.01); *G06F 3/04886* (2013.01); *G06F 17/2223* (2013.01); *G06F 17/2785* (2013.01); *G06F 17/2863* (2013.01)

(58) Field of Classification Search
None
See application file for complete search history.

(56) References Cited

U.S. PATENT DOCUMENTS

| | | | | |
|---|---|---|---|---|
| 7,091,954 | B2 * | 8/2006 | Iesaka | G06F 1/1616 345/156 |
| 7,302,640 | B2 * | 11/2007 | Lee | G06F 17/2223 455/566 |
| 8,044,827 | B2 * | 10/2011 | Jarczyk | G06F 3/04883 341/22 |
| 8,390,572 | B2 * | 3/2013 | Marsden | G06F 3/04886 345/168 |
| 8,797,266 | B2 * | 8/2014 | Dennis | G06F 17/276 345/168 |
| 9,026,426 | B2 * | 5/2015 | Wu | G06F 3/018 704/1 |
| 9,110,590 | B2 * | 8/2015 | Marsden | G06F 3/04886 |
| 9,323,340 | B2 * | 4/2016 | Pantel | G06F 3/017 |
| 9,495,016 | B2 * | 11/2016 | Dennis | G06F 17/276 |
| 9,525,906 | B2 * | 12/2016 | Lai | H04N 21/4223 |
| 2015/0067571 | A1 * | 3/2015 | Marsden | G06F 3/0488 715/773 |

(Continued)

*Primary Examiner* — Satwant Singh
(74) *Attorney, Agent, or Firm* — Cheng-Ju Chiang

(57) ABSTRACT

A method for inputting multi-language texts in digital devices and/or electronic devices comprises steps of determining syllables in texts to be input, separating the texts to be input into text units for inputting according to the determined syllables therein, inputting the texts to be input via inputting the text units one by one in sequence, defining an original position for a hand of users for inputting, defining at least one operation direction directing away from the original position, defining at least one inputting position along each of the at least one operation direction, assigning an alphabet to the each of the at least one inputting position, and inputting the texts to be input by moving at least one finger of the hand from the original position to the each of the at least one inputting position.

19 Claims, 11 Drawing Sheets

(56) References Cited

U.S. PATENT DOCUMENTS

| | | | |
|---|---|---|---|
| 2015/0242118 A1* | 8/2015 | Zhang | G06F 3/04886 715/773 |
| 2015/0277752 A1* | 10/2015 | Mannby | G06F 3/04886 715/773 |
| 2015/0278176 A1* | 10/2015 | Mannby | G06F 3/04886 715/256 |
| 2016/0246441 A1* | 8/2016 | Westerman | G06F 3/0235 |
| 2017/0131760 A1* | 5/2017 | Xie | G06F 3/005 |

\* cited by examiner

METHOD FOR INPUTTING MULTI-LANGUAGE TEXTS

BACKGROUND OF THE INVENTION

1. Field of the Invention

The present invention relates to a method for inputting multi-language texts in digital devices and/or electronic devices, particularly to a method of separating texts to be input into text units for inputting according to syllables determined from the texts to be input, and of assigning fingers of a hand of users for inputting each required alphabet of the each text unit.

2. The Related Arts

Inputting data, particularly a lot of texts included in the data, in digital devices, become more important since the first computer appears in the world. In particular, inputting work is usually heavy and time consuming when paper documents with lots of data are required to be digitalized in computers during the last century. At an earlier time of digitalizing data, a keyboard of computers is the only inputting device for data inputting. Skills to rapidly key in words using keyboards of computers play an important role on resumes for people to find jobs. However, skilled workers with fast inputting speeds using keyboards should be well trained. In other words, beginners of computers are difficult to become efficient workers if they cannot practice using keyboard frequently.

Besides, even for a skilled worker with a really fast text-input speed, inputting words or texts is still a time consuming job since every alphabet in the words and texts has to be input one by one in sequence. For example, if inputting an alphabet takes one second, inputting fifteen alphabets will be required to take fifteen seconds, and it is no way to input them shorter than fifteen seconds when no alphabet is omitted to be input. As a result, lots of data including huge amounts of texts/words for inputting will become a nightmare for everyone since inputting them will take quite long time and will become boring for everyone easily.

Newer input devices have been designed subsequently in the computer market for easy access of beginners. These newer input devices include, for example, a hand-writing recognition device and a virtual keyboard pop out on a touch screen such as iPads®. However, none of these newer input devices help to improve the above since, for one, every alphabet in the words and texts is still required to be input one by one in sequence on the touch screen, and, for the other, writing every word in texts by hands properly for digital recognition takes time as well. Hence, a better way to save time and labors for inputting texts is not yet found in the current market.

BRIEF DESCRIPTION OF THE DRAWINGS

The present disclosure will become more readily apparent to those ordinarily skilled in the art after reviewing the following detailed description and accompanying drawings, in which.

DETAILED DESCRIPTION OF PREFERRED EMBODIMENT

Figure 1:
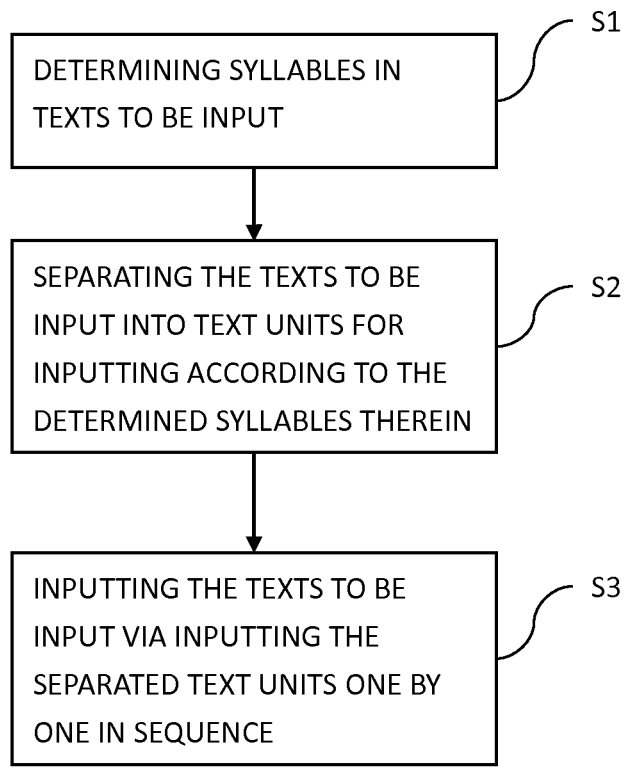
FIG. 1 shows a schematic flow chart of a method for inputting multi-language texts in accordance with a preferred embodiment of the present invention.

With reference to FIG. 1, a method for inputting multi-language texts in a computing device in accordance with an embodiment of the present invention comprises steps as follows.

Figure 2:
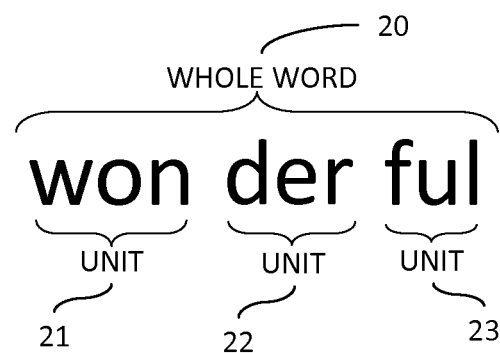
FIG. 2 shows a schematic exemplary diagram of a preferred embodiment of the method as shown in FIG. 1 in accordance with the present invention.

A step S1 of determining syllables in texts to be input of the method in accordance with an embodiment of the present invention is firstly executed. In the step S1, the texts to be input are determined to contain a particular number of syllables therein at first. Referring to FIG. 2, for example, the texts to be input include an English word of "wonderful" 20. The word of "wonderful" 20 is about to be separated into three text units based on its syllables of "won" 21, "der" 22 and "ful" 23, as shown in FIG. 2. In another example, referring to FIG. 3, the texts to be input include a Chinese phrase of "中文" 30. Since each Chinese character is pronounced by one syllable, the Chinese phrase of "中文" 30 is considered to have two syllables due to its two Chinese characters. In other words, the Chinese phrase of "中文" 30 is about to be separated into two text units 31, 32 based on its two syllables, i.e., a character count of its Chinese characters, in the Chinese phrase of "中文" 30.

Figure 3:
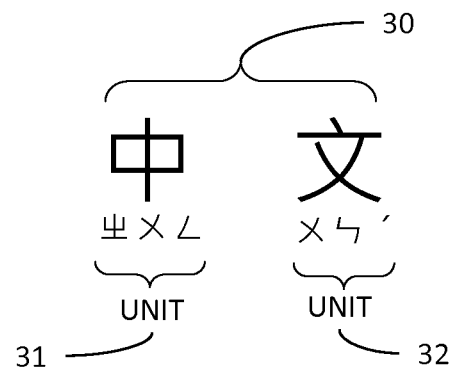
FIG. 3 shows a schematic exemplary diagram of another preferred embodiment of the method as shown in FIG. 1 in accordance with the present invention.

A step S2 of separating the texts to be input into text units for inputting according to the determined syllables therein of the method in accordance with an embodiment of the present invention is executed following the step S1. In the step S2, the texts to be input are separated into corresponding text units according to the determined syllables therein as depicted above. For example, the texts to be input as shown in FIG. 2 are separated into three text units according to determination of its three syllables, and texts to be input as shown in FIG. 3 are separated into two text units according to determination of its two syllables.

Figure 4:
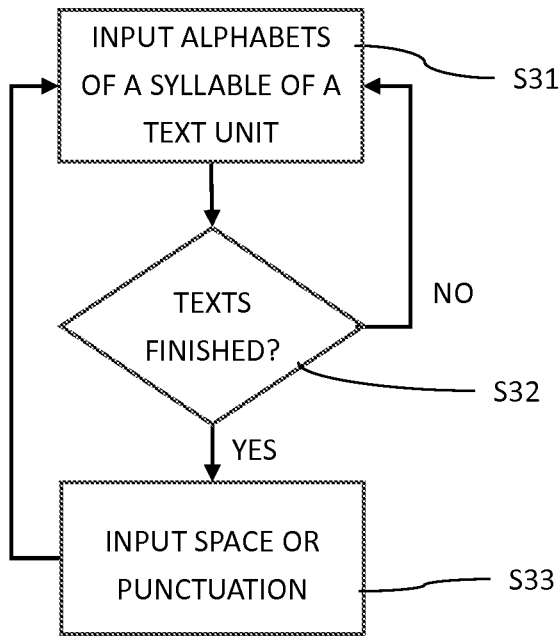
FIG. 4 shows a schematic flow chart showing details of a step S3 as shown in FIG. 1 in accordance with a preferred embodiment of the present invention.
Figure 5:
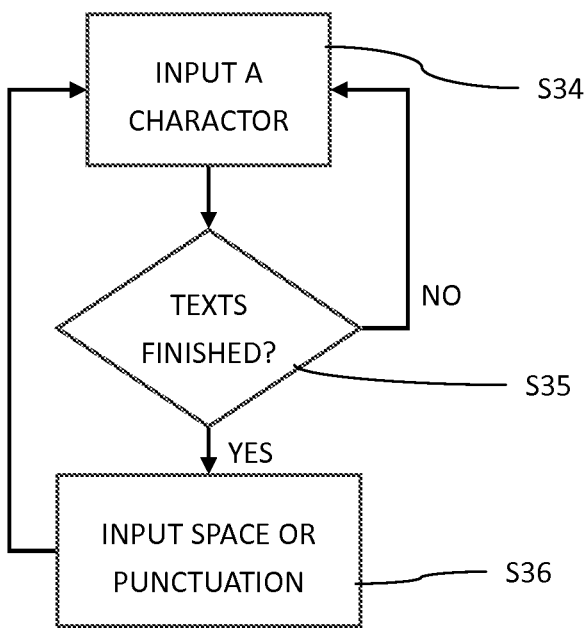
FIG. 5 shows a schematic flow chart showing details of a step S3 as shown in FIG. 1 in accordance with another preferred embodiment of the present invention.

A step S3 of inputting the texts to be input via inputting the text units one by one in sequence of the method in accordance with an embodiment of the present invention is executed following the step S2. In the step S3, each text unit of the texts to be input is input one by one in sequence. For example, in FIG. 2, "won" of a first text unit 21 separated from "wonderful" 20 is input at first, followed by a second text unit of "der" 22, and finally followed a third text unit of "ful" 23. In details, as shown in FIG. 4, all alphabets in a syllable of a text unit are input together. For example, in a step S31, "w", "o" and "n" in "won" of the first text unit 21 are input at the same time since they are all in the first text unit 21. The second text unit of "der" 22 and the third text unit of "ful" 23 are input one by one following the first text unit of "won" 21 until the texts to be input are completely input. In a step S32, the texts to be input are checked and reviewed to determine whether input of the texts to be input is finished. If not, the step S31 is executed again. If so, in a step S33, a "space" or "punctuation" is input to terminate the input of the texts to be input and to wait for a next text input. In another example as shown in FIG. 3, "中" of a first text unit 31 separated from "中文" 30 is input at first and followed by a second text unit of "文" 32. In details, as shown in FIG. 5, a Chinese character in a text unit is input based on either its corresponding Mandarin phonetic symbols/alphabets or its corresponding Mandarin Pinyin alphabets. For example, in a step S34 and referring to FIG. 3, "ㄓ", "ㄨ" and "ㄥ" in "中" of the first text unit 31 are input at the same time since they are corresponding Mandarin phonetic symbols/alphabets in the first text unit 31. The second text unit of "文" 32 is input following the first text unit of "中" 31 until the texts to be input are completely input. In a step S35, the texts to be input are checked and reviewed to determine whether input of the texts to be input is finished. If not, the step S34 is executed again. If so, in a step S36, a "space" or "punctuation" is input to terminate the input of the texts to be input and to wait for a next text input.

Figure 6:
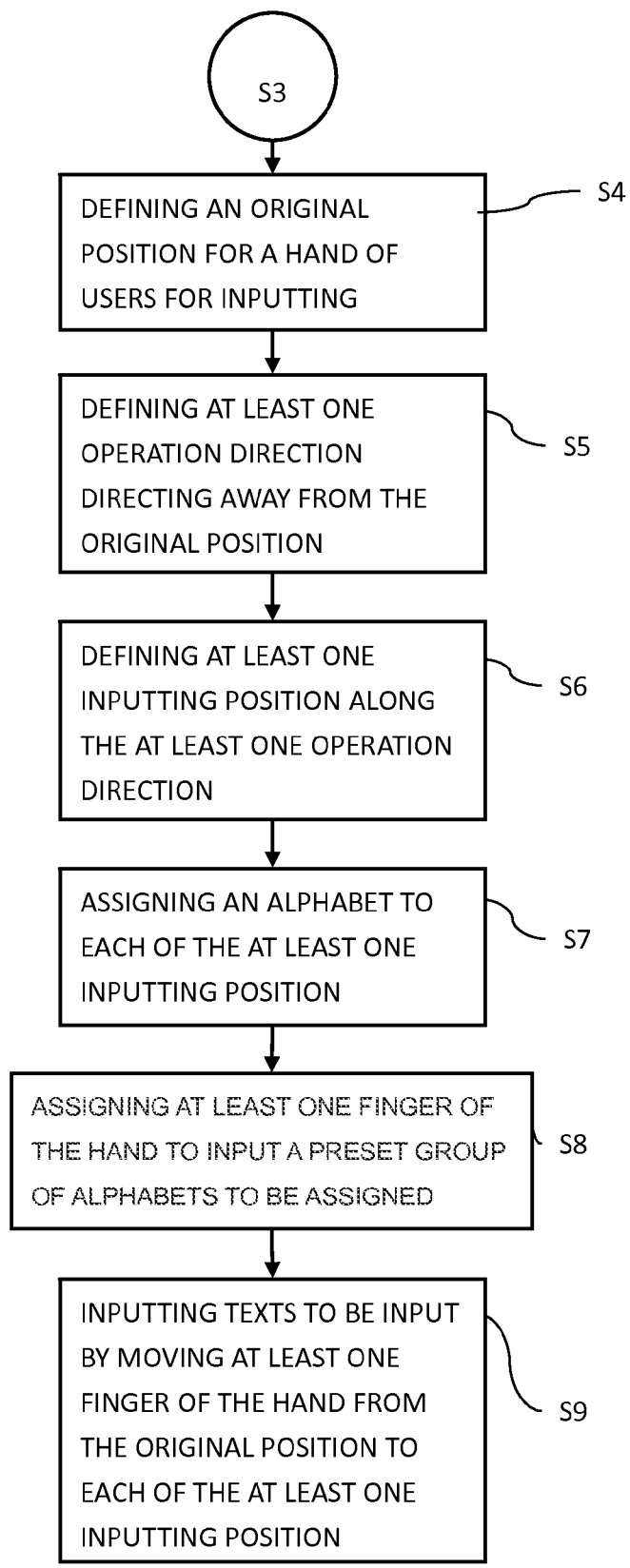
FIG. 6 shows a schematic flow chart of the method for inputting multi-language texts as shown in FIG. 1 in accordance with a preferred embodiment of the present invention.

Referring to FIG. 6, a method for inputting multi-language texts in accordance with an embodiment of the present invention comprises steps as follows.

A step S4 of defining an original position for a hand of users for inputting of the method in accordance with an embodiment of the present invention is executed following the step S3 of FIG. 1. In the step S4, an original position of a hand of users is preset before inputting the texts to be input at first. Particularly, the original position of the hand of users is decided to include original positions of all fingers of the hand. Positions and movements of the hand and fingers of the hand can be detected by detectors or detecting devices, including web cams, motion sensors, etc. Once the original position of the hand is preset, any movement of the hand away from the original position will be treated as an inputting attempt for the texts to be input.

Figure 7:
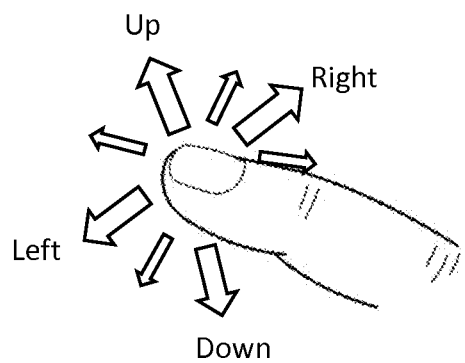
FIG. 7 shows a schematic exemplary diagram of a preferred embodiment of the method as shown in FIG. 6 showing finger moving in accordance with the present invention.
Figure 8:
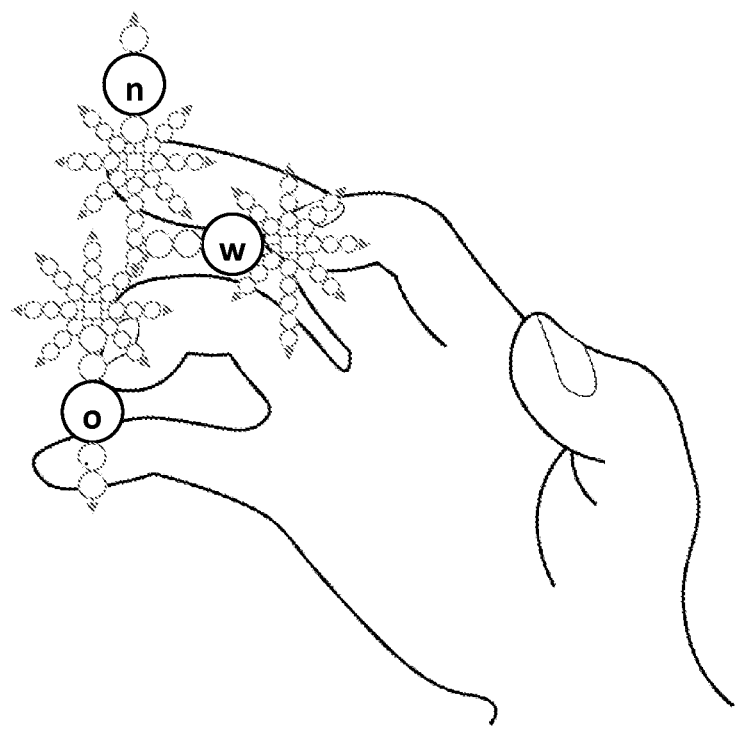
FIG. 8 shows a schematic exemplary diagram of a preferred embodiment of the method as shown in FIG. 6 showing finger moving of a hand of users in accordance with the present invention.

A step S5 of defining at least one operation direction axis directing away from the original position of the method in accordance with an embodiment of the present invention is executed following the step S4. In the step S5, at least one operation direction axis directing away from the original position is defined for the fingers of the hand to move along therewith. In a preferred embodiment, eight operation direction axes directing away from the original position are defined. The eight operation direction axes are distributed in a three dimensional space around the original position according to nimbleness and active ranges of each of the fingers of the hand. In other words, each of the operation direction axes can extend either straightly or curvedly away from the original position. As shown in FIG. 7, using an index finger of the hand as an example, the eight operation direction axes comprise an "up" direction axis U, a "down" direction axis D, a "left" direction axis L, a "right" direction axis R, an "upper-left" direction axis UL, a "lower-left" direction axis DL, an "upper-right" direction axis UR and a "lower-right" direction axis DR. In a preferred embodiment of the present invention, the preset original position comprises original positions of all fingers of the hand of users. As a result, as shown in FIG. 8, a finger original position and eight operation direction axes are defined in advance for each finger of all fingers of the hand. Particularly, in FIG. 8, three fingers of the hand, including the index finger, a middle finger and a ring finger, are depicted to use a finger original position and eight operation direction axes of their own.

Figure 9:
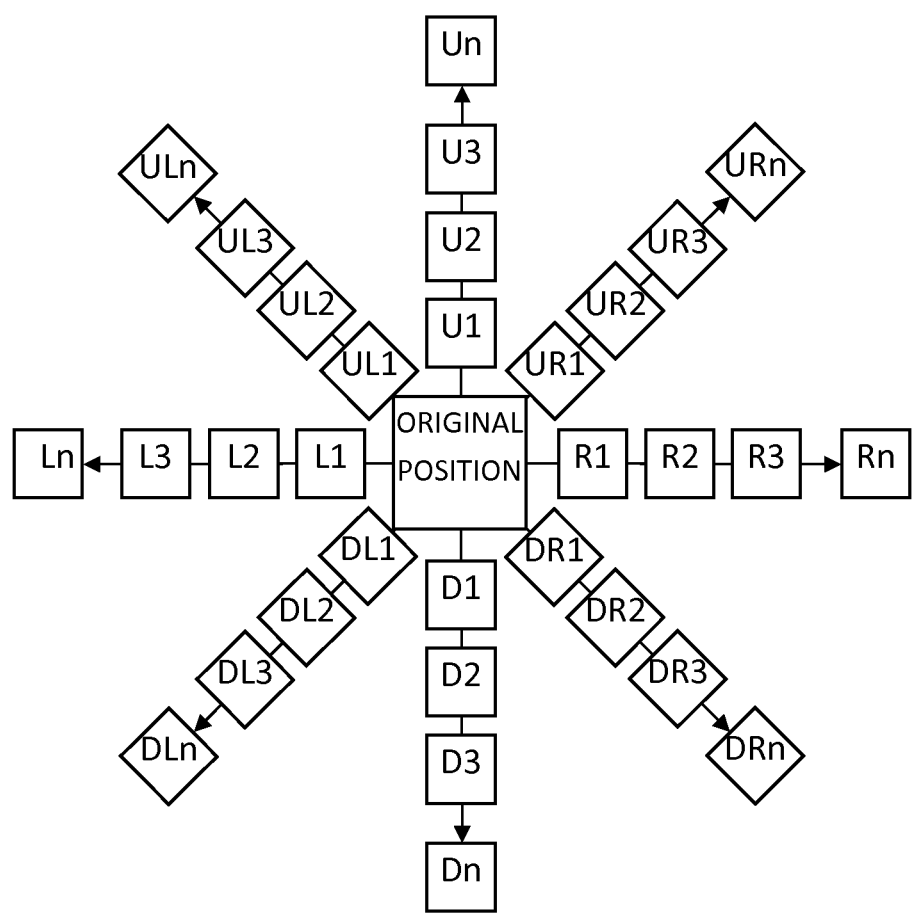
FIG. 9 shows a schematic exemplary diagram of a preferred embodiment of the method as shown in FIG. 6 showing preset inputting positions for alphabet assignment in accordance with the present invention.

A step S6 of defining at least one inputting position along the at least one operation direction axis of the method in accordance with an embodiment of the present invention is executed following the step S5. In the step S6, a plurality of inputting positions is defined along each direction axis of the at least one operation direction axis. Particularly, in FIG. 9, n inputting positions can be defined along each of the at least one operation direction axis wherein n is a positive integer equal to or more than 1. In details, for example, inputting positions U1, U2, U3, . . . , Un are defined along the "up" direction axis U as shown in FIG. 9. Inputting positions D1, D2, D3, . . . , Dn are defined along the "down" direction axis D. Inputting positions L1, L2, L3, . . . , Ln are defined along the "left" direction axis L. Inputting positions R1, R2, R3, . . . , Rn are defined along the "right" direction axis R. Inputting positions UL1, UL2, UL3, . . . , ULn are defined along the "upper-left" direction axis UL. Inputting positions DL1, DL2, DL3, . . . , DLn are defined along the "lower-left" direction axis DL. Inputting positions UR1, UR2, UR3, . . . , URn are defined along the "upper-right" direction axis UR. Inputting positions DR1, DR2, DR3, . . . , DRn are defined along the "lower-right" direction axis DR. In a preferred embodiment of present invention, n is defined and decided based on sensitivity and detecting ranges of the detectors or detecting devices. Especially, more inputting positions, i.e., a larger number of n, can be defined along a particular operation direction axis (the "up" direction axis, for example) when a higher sensitivity detector or detecting device is used. Similarly, more inputting positions, i.e., a larger number of n, can be defined along a particular operation direction axis (the "up" direction axis, for example) when a more largely ranged detector or detecting device is used. In a preferred embodiment of the present invention, each inputting position along a particular operation direction axis (the "up" direction axis, for example) is spaced from neighboring inputting position by a preset distance, which is distinguishable by the detectors or the detecting devices. Reasonably, a shorter distance can be set as the preset distance when a higher sensitivity detector or detecting device is used.

Figure 10:
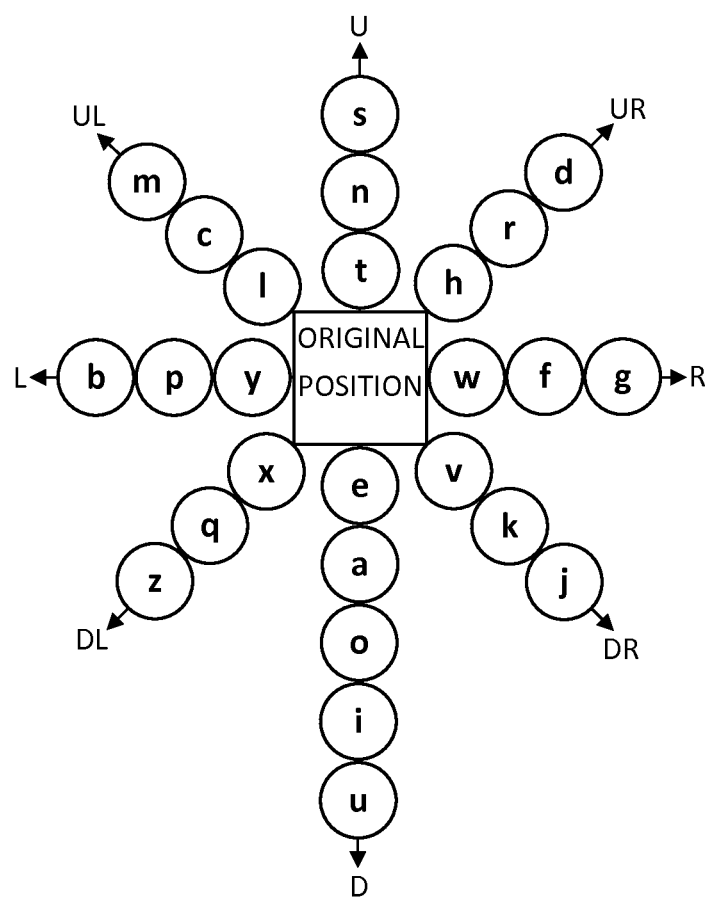
FIG. 10 shows a schematic exemplary diagram of a preferred embodiment of the method as shown in FIG. 6 showing alphabet assignment in accordance with the present invention.
Figure 11:
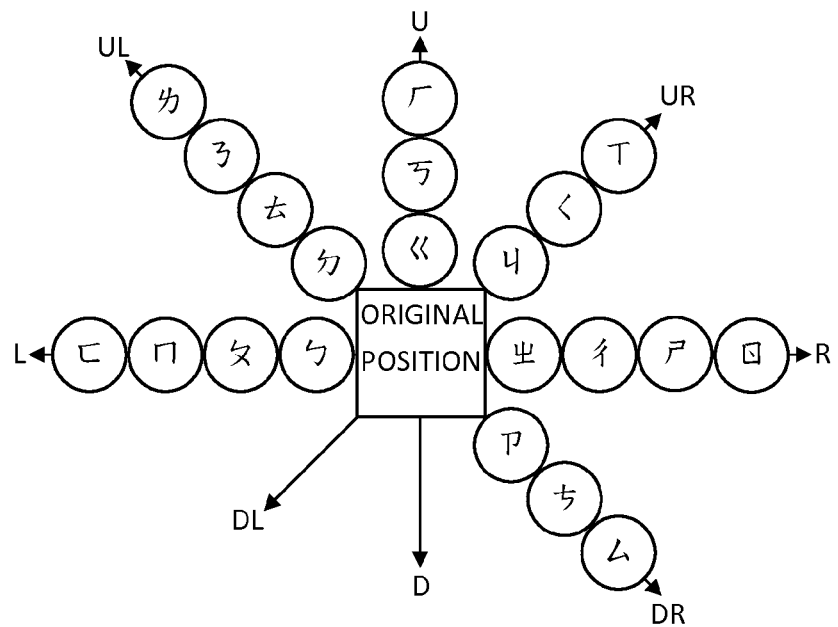
FIG. 11 shows a schematic exemplary diagram of another preferred embodiment of the method as shown in FIG. 6 showing alphabet assignment in accordance with the present invention.
Figure 12:
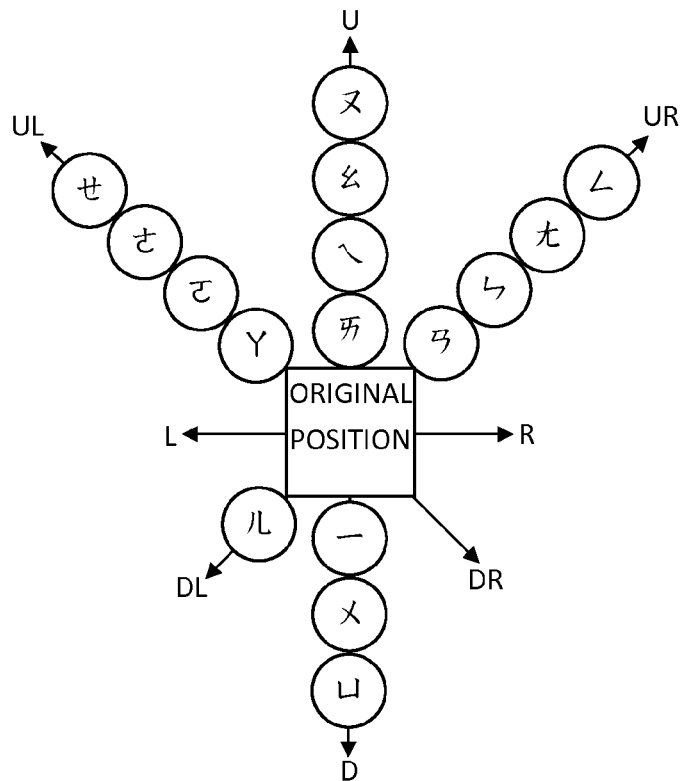
FIG. 12 shows a schematic exemplary diagram of the another preferred embodiment of the method as shown in FIG. 6 showing another alphabet assignment in accordance with the present invention.
Figure 13:
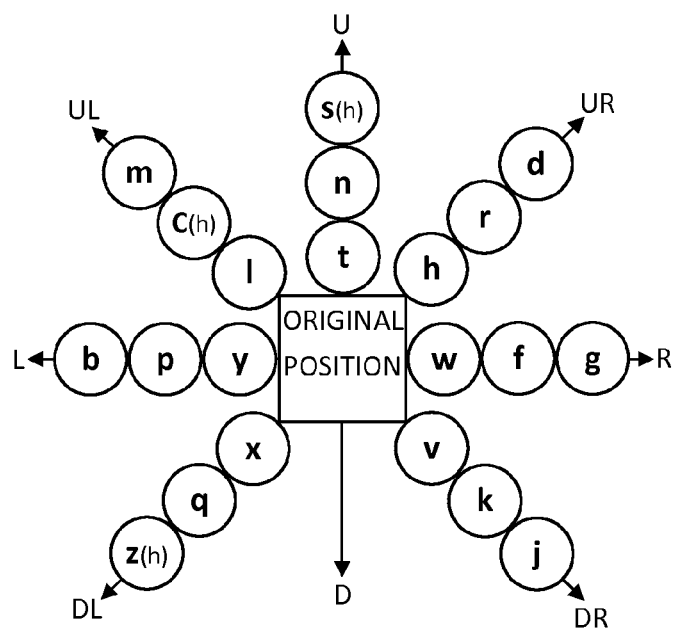
FIG. 13 shows a schematic exemplary diagram of further another preferred embodiment of the method as shown in FIG. 6 showing alphabet assignment in accordance with the present invention.
Figure 14:
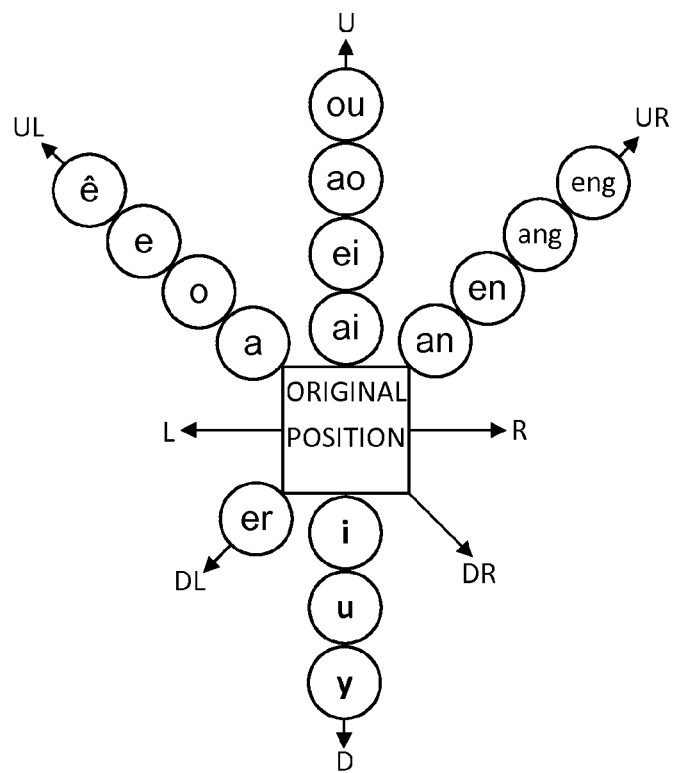
FIG. 14 shows a schematic exemplary diagram of the further another preferred embodiment of the method as shown in FIG. 6 showing another alphabet assignment in accordance with the present invention.

A step S7 of assigning an alphabet to each of the at least one inputting position of the method in accordance with an embodiment of the present invention is executed following the step S6. In the step S7, alphabets of different languages are assigned to each of the at least one inputting position along the at least one operation direction axis. In a preferred embodiment of the present invention, in the case of inputting English texts to be input, English alphabets are completely assigned to the eight operation direction axes as shown in FIG. 10. In details, vowel alphabets, "e", "a", "i", "o" and "u", are respectively assigned to the inputting positions of "D1" to "D5". Consonant alphabets "s", "n" and "t" are respectively assigned to the inputting positions of "U1" to "U3". Other consonant alphabets are assigned to the inputting positions of "L1" to "L3", "R1" to "R3", "UL1" to "UL3", "DL1" to "DL3", "UR1" to "UR3" and "DR1" to "DR3". In a preferred embodiment of the present invention, alphabet assignment is decided based on equal distribution along all operation direction axes. In another preferred embodiment of the present invention, alphabet assignment is decided based on nimbleness and activity ranges of fingers of the hand. FIG. 11 shows an example of alphabet assignment for consonant alphabets of Mandarin phonetic symbols/alphabets for Chinese texts to be input. FIG. 12 shows an example of alphabet assignment for rhyme and medical alphabets of Mandarin phonetic symbols/alphabets for Chinese texts to be input. FIG. 13 shows an example of alphabet assignment for consonant alphabets of Mandarin Pinyin alphabets for Chinese texts to be input. FIG. 14 shows an example of alphabet assignment for rhyme and medical alphabets of Mandarin Pinyin alphabets for Chinese texts to be input.

Figure 15:
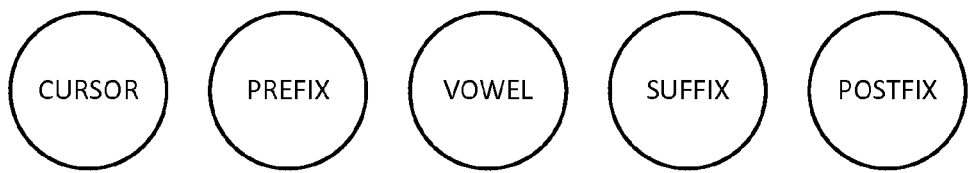
FIG. 15 shows a schematic exemplary diagram of a preferred embodiment of the method as shown in FIG. 6 showing finger assignment in accordance with the present invention.

A step S8 of assigning at least one finger of the hand to input a preset group of alphabets to be assigned of the method in accordance with an embodiment of the present invention is executed following the step S7. In the step S8, fingers of the hand are assigned to respectively input particular alphabets. In details, for example, as shown in FIG. 15, a finger of the hand is assigned to assist for controlling and moving cursors displayed on displays. A finger of the hand is assigned to input prefix alphabets, i.e., a first alphabet of an English syllable or a Chinese character. The prefix alphabet is one of consonant alphabets of an English syllable and consonant alphabets of Mandarin phonetic symbols/alphabets or Mandarin Pinyin alphabets. A finger of the hand is assigned to input vowel alphabets of an English syllable, or medial alphabets of a Chinese character. A finger of the hand is assigned to input suffix alphabets, i.e., a tail alphabet following vowel alphabets of an English syllable or rhyme alphabets of a Chinese character. The suffix alphabet is one of consonant alphabets of an English syllable and rhyme alphabets of Mandarin phonetic symbols/alphabets or Mandarin Pinyin alphabets. A finger of the hand is assigned to input postfix alphabets, i.e., additional assistant inputs due to a same spelling combination of an English syllable with same prefix, vowel and suffix alphabets, or due to tone selection for Mandarin phonetic symbols/alphabets or Mandarin Pinyin alphabets.

Figure 16:
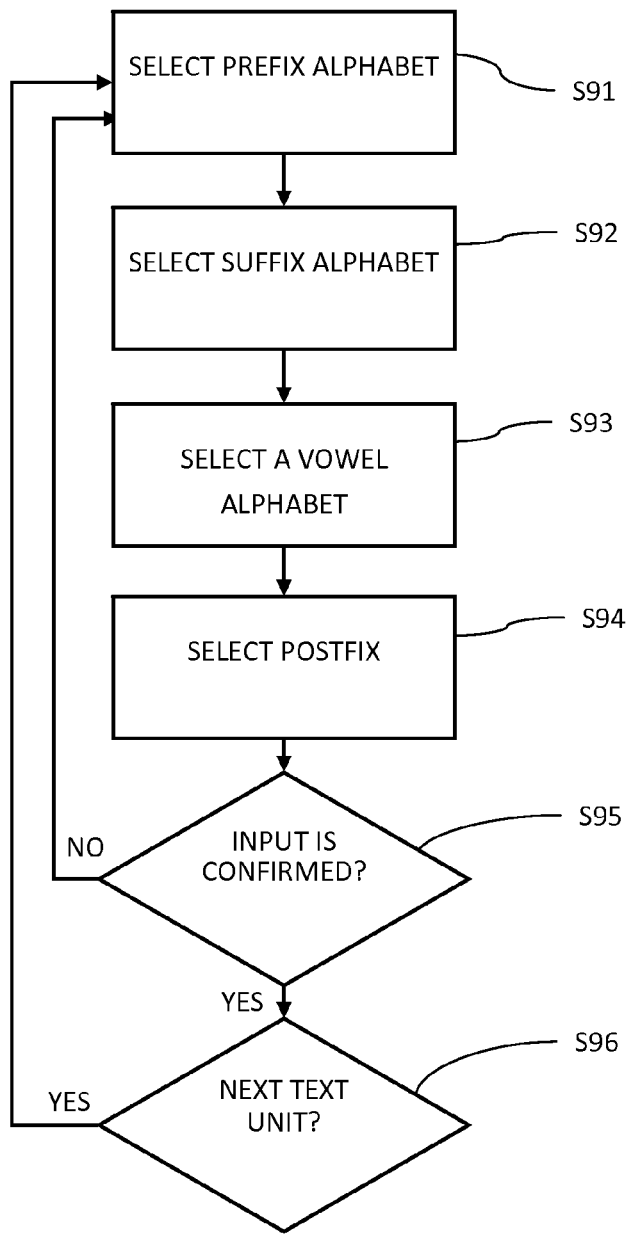
FIG. 16 shows schematic flow chart of the method for inputting multi-language texts showing details of a Step S9 as shown in FIG. 6 in accordance with a preferred embodiment of the present invention.

A step S9 of inputting texts to be input by moving at least one finger of the hand from the original position to the each of the at least one inputting position of the method in accordance with an embodiment of the present invention is executed following the step S8. In the step S9, the texts to be input are input by moving fingers of the hand along an assigned operation direction axis from their finger original positions to corresponding inputting positions to alphabets required to be input. In details, for example, referring to FIG. 2, FIG. 9, FIG. 10, FIG. 15 and FIG. 16 at the same time, the texts to be input of English word "wonderful" 20 in FIG. 2 will be input separately based on syllables of "wonderful" 20, i.e., three text units of "won" 21, "der" 22 and "ful" 23. In a preferred embodiment of the present invention, as shown in FIG. 8 and FIG. 15, an index finger of the hand is assigned to input prefix alphabets, a middle finger of the hand is assigned to input suffix alphabets and a ring finger of the hand is assigned to input vowel alphabets. Hence, as depicted in FIG. 8, "w" of "won" 21 as a prefix alphabet of the text unit 21 of "won" is input by the assigned index finger of the hand, "o" of "won" 21 as a vowel alphabet of the text unit 21 of "won" is input by the assigned ring finger of the hand, and "n" of "won" 21 as a suffix alphabet of the text unit 21 of "won" is input by the assigned middle finger of the hand. In a preferred embodiment of the present invention, referring to FIG. 16, the step S9 of inputting texts to be input is further executed by sub-steps as follows. A sub-step S91 of selecting a prefix alphabet to be input of the method in accordance with an embodiment of the present invention is executed in the step S9. In the sub-step S91, for example, referring to FIG. 8 to FIG. 10, "w" of the text unit 21 of "won" is selected to be input by moving the assigned index finger of the hand from its original position toward the inputting position R1 which is assigned for the "w" alphabet. A sub-step S92 of selecting a suffix alphabet to be input of the method in accordance with an embodiment of the present invention is executed in the step S9. In the sub-step S92, for example, referring to FIG. 8 to FIG. 10, "n" of the text unit 21 of "won" is selected to be input by moving the assigned middle finger of the hand from its original position toward the inputting position U2 which is assigned for the "n" alphabet. A sub-step S93 of selecting a vowel alphabet to be input of the method in accordance with an embodiment of the present invention is executed in the step S9. In the sub-step S93, for example, referring to FIG. 8 to FIG. 10, "o" of the text unit 21 of "won" is selected to be input by moving the assigned ring finger of the hand from its original position toward the inputting position D3 which is assigned for the "o" alphabet. A sub-step S94 of selecting a postfix alphabet to be input of the method in accordance with an embodiment of the present invention is executed in the step S9. Even though sub-steps S91 to S94 of FIG. 16 are presented in a particular sequence, all alphabets required to be input for a same text unit are actually input simultaneously. Hence, sub-steps S91 to S94 are in fact executed at the same time since all fingers of the hand are able to move together if necessary. A sub-step S95 of determining whether input of a current text unit is confirmed to be completed of the method in accordance with an embodiment of the present invention is executed following the sub-steps S91 to S94 in the step S9. If not, the sub-steps S91 to S94 are required to be executed again. If so, a sub-step S96 of determining whether inputting of a next text unit or a next syllable of the texts to be input is required to be executed of the method in accordance with an embodiment of the present invention is executed following the sub-step S95 in the step S9. If so, the next text unit required to be input is input by repeating S91 to S95. If not, input of the texts to be input is completed and terminated and the system is set to wait for further instruction.

Referring to FIG. 3, FIG. 9, FIG. 11, FIG. 12 and FIG. 15, another example of the Chinese phrase of "中文" 30 as the texts to be input is input separately by two text units of "ㄓ" 31 and "ㄨ" 32. For input of the first text unit 31 of "ㄓ", in details, "ㄓ" as a prefix alphabet of the text unit 31 of "ㄓ" is input by the assigned index finger of the hand. In other words, "ㄓ" is selected to be input by moving the assigned index finger of the hand from its original position toward the inputting position R1 which is assigned for the "ㄓ" alphabet, as shown in FIG. 11. "ㄨ" as a medial alphabet of the text unit 31 of "ㄓ" is input by the assigned ring finger of the hand. In other words, "ㄨ" is selected to be input by moving the assigned ring finger of the hand from its original position toward the inputting position D2 which is assigned for the "ㄨ" alphabet, as shown in FIG. 12. "ㄥ" as a rhyme alphabet of the text unit 31 of "ㄓ" is input by the assigned middle finger of the hand. In other words, "ㄥ" is selected to be input by moving the assigned middle finger of the hand from its original position toward the inputting position UR4 which is assigned for the "ㄥ" alphabet, as shown in FIG. 12. The little finger of the hand is assigned to input postfix alphabets and is required for input of the text unit 31 of "ㄓ" for tone selection. The next text unit 32 of "ㄨ" is input by using the assigned ring finger to present its "ㄨ" alphabet, the assigned middle finger to present its "ㄣ" alphabet and the assigned little finger to present its tone selection.

In a preferred embodiment of the present invention, as a feedback of the method for inputting multi-language texts in accordance with the present invention, a video display is used to display all input alphabets in real time. Images of FIG. 10 to FIG. 14 are entirely displayed on the video display to immediately display finger movement of the hand relative to the defined operation direction axes and inputting positions in the images. In another embodiment of the present invention, only input alphabets are displayed on the video display for space saving. Users are able to react to incorrect input of the texts to be input by finding incorrect input from display of the video display. Other feedback methods are available to use and practice the method for inputting multi-language texts of the present invention based on actual situations and environments.

Figure 17:
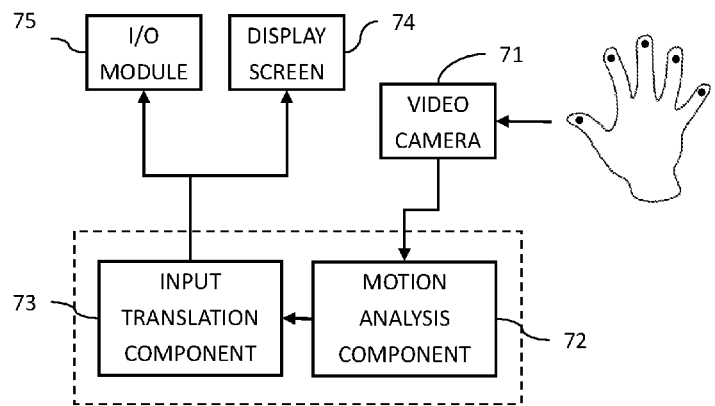
FIG. 17 shows a schematic exemplary diagram of a preferred embodiment of equipment for practicing the method as shown in FIG. 1 in accordance with the present invention.

In a preferred embodiment of the present invention, the method for inputting multi-language texts in accordance with the present invention can be practiced by using particularly designed equipment. An equipment to practice the method of the present invention, as shown in FIG. 17, comprises a video camera 71, a motion analysis component 72 and an input translation component 73. The video camera 71 is used to capture movements of fingers of the hand of users. Captured images from the video camera 71 are transmitted to the motion analysis component 72 for further analysis. The motion analysis component 72 is used to receive the capture images from the video camera 71, and then to analyze finger motions and decide corresponding final inputting positions of the fingers of the hand relative to original positions of the fingers based on the analyzed finger motions. The analyzed finger motions and decided inputting positions are then transmitted to the input translation component 73 for further processing. The input translation component 73 is used to receive the analyzed finger motions and decided inputting positions from the motion analysis component 72, and to translate the analyzed finger motions and decided inputting positions into digital data. The translated data is then transmittable to a display screen 74 of a video display or any display device, such a computer or a mobile phone, via input/output (I/O) modules/Interfaces 75.

Figure 18:
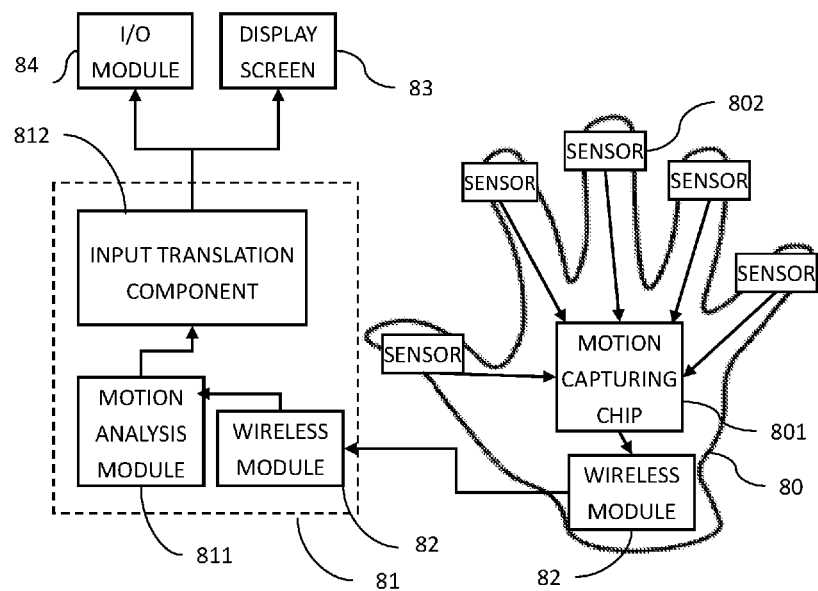
FIG. 18 shows a schematic exemplary diagram of another preferred embodiment of equipment for practicing the method as shown in FIG. 1 in accordance with the present invention.

In another preferred embodiment of the present invention, referring to FIG. 18, a wearable glove 80 for the hand of users is designed for practicing the method for inputting multi-language texts in accordance with the present invention. A processor 81 is wirelessly coupled with the glove 80 via wireless modules 82 respectively disposed in the glove 80 and processor 81. The glove 80 further comprises a motion capturing chip 801 and sensors 802 signal communicable with the motion capturing chip 801. The sensors 802 are used to sense detailed movements of fingers of the hand of users. The sensed finger movements are signally transmitted to the motion capturing chip 801 from the sensors 802. The motion capturing chip 801 is used to translate the sensed finger movements into electrical signals, and to transmit the signals to the processor 81 via the wireless modules 82. The processor 81 comprises a motion analysis module 811 and an input translation component 812. The motion analysis module 811 is used to receive the signals from the motion capturing chip 801, and to analyze finger motions and decide corresponding final inputting positions of the fingers of the hand relative to original positions of the fingers based on the analyzed finger motions. The analyzed finger motions and decided inputting positions are then transmitted to the input translation component 812 for further processing. The input translation component 812 is used to receive the analyzed finger motions and decided inputting positions from the motion analysis module 811, and to translate the analyzed finger motions and decided inputting positions into digital data. The translated data is then transmittable to a display screen 83 of a video display or any display device, such a computer or a mobile phone, via input/output (I/O) modules/Interfaces 84.

Although only the preferred embodiments of the present invention are described as above, the practicing claim scope of the present invention is not limited to the disclosed embodiments. It is understood that any simple equivalent changes, adjustments or modifications to the present invention based on the following claims of the present invention and the content of the above invention description may be still covered within the claimed scope of the following claims of the present invention.

What is claimed is:

1. A computing-device implemented method for inputting multi-language texts in a computing device, comprising:
   determining syllables in a text to be input;
   separating the text to be input into text units for inputting according to the determined syllables therein;
   inputting all alphabets in a first text unit of the separated text units of the text to be input at the same time by a one-time hand motion of a user;
   sensing the hand motion of the user by the computing device to display the input alphabets of the first text unit in the computing device; and
   repeating the inputting step and the sensing step for a next text unit until all of the separated text units are input one by one in sequence.

2. The method as claimed in claim 1, wherein alphabets of each of the text units are required for inputting based on one of the determined syllables.

3. The method as claimed in claim 1, wherein each alphabet of one of the text units is input by a finger of one hand of the user different from fingers of the one hand assigned for other alphabets of the one of the text units in the hand motion of the user.

4. The method as claimed in claim 3, wherein the each alphabet is input by moving the finger of the one hand of the user to a preset inputting position along a preset operation direction axis.

5. The method as claimed in claim 4, wherein the finger of the one hand of the user is configured to move along at least four preset operation direction axes, each of the at least four preset operation direction axes is orthogonal to two other preset operation direction axes.

6. The method as claimed in claim 3, wherein one of the each alphabet is a prefix alphabet, and another of the each alphabet is a vowel alphabet.

7. A computing-device implemented method for inputting multi-language texts in a computing device, comprising:
    defining an original position for a hand of users for inputting;
    defining at least one operation direction axis directing away from the original position;
    defining more than one inputting position along each of the at least one operation direction axis, wherein each of the more than one inputting position is spaced from the original position along the each of the at least one operation direction axis by a multiple of a preset distance which is distinguishable by a detector, a number of the multiple of the preset distance for the each of the more than one inputting position is different from a number of a multiple of the preset distance for another of the more than one inputting position;
    assigning an alphabet to the each of the more than one inputting position; and
    inputting texts to be input by moving at least one finger of the hand from the original position to the each of the more than one inputting position when the assigned alphabet is required for inputting of the texts to be input.

8. The method as claimed in claim 7, wherein the at least one operation direction axis comprises eight operation direction axes.

9. The method as claimed in claim 8, wherein each of the eight operation direction axes is orthogonal to two other operation direction axes out of the eight operation direction axes.

10. The method as claimed in claim 7, further comprising a step of assigning at least one finger of the hand to input a preset group of alphabets to be assigned before the step of inputting texts to be input.

11. The method as claimed in claim 10, wherein the at least one finger of the hand is assigned to input a selective one of cursors, prefix alphabets, vowel alphabets, suffix alphabets and postfix alphabets.

12. The method as claimed in claim 11, wherein one of the at least one finger of the hand is assigned to input prefix alphabets, and another of the at least one finger of the hand is assigned to input vowel alphabets.

13. The method as claimed in claim 7, further comprising a step of separating the texts to be input into text units for inputting according to syllables determined from the texts to be input.

14. A computing-device implemented method for inputting multi-language texts in a computing device, comprising:
    separating texts to be input into text units for inputting according to syllables determined in the texts to be input;
    determining alphabets required for each text unit out of the separated text units based on one of the determined syllables;
    assigning a finger of a hand of a user for inputting each of the required alphabets of the each text unit;
    inputting the each of the required alphabets of the each text unit by moving the assigned finger of the hand of the user together with input of the rest of the required alphabets simultaneously;
    sensing movement of the assigned finger of the hand of the user by the computing device to complete input of the each text unit at one time; and
    inputting the separated text units one by one in sequence to complete input of the texts to be input.

15. The method as claimed in claim 14, wherein the each of the required alphabets is a selective one of a cursor, a prefix alphabet, a vowel alphabet, a suffix alphabet and a postfix alphabet.

16. The method as claimed in claim 14, wherein a number of the required alphabets of the each text unit is same as a number of fingers of the hand of the user to be assigned.

17. The method as claimed in claim 14, wherein the each of the required alphabets is input by moving the assigned finger of the hand of the user to a preset inputting position along a preset operation direction axis.

18. The method as claimed in claim 14, wherein one of the each of the required alphabets is a prefix alphabet, and another of the each of the required alphabets is a vowel alphabet.

19. The method as claimed in claim 14, wherein the assigned finger of the hand of the user is configured to move along at least four preset operation direction axes, each of the at least four preset operation direction axes is orthogonal to two other preset operation direction axes.

* * * * *